United States Patent [19]

Niessner et al.

[11] Patent Number: 5,760,226
[45] Date of Patent: Jun. 2, 1998

[54] AMINOTRIAZINE DERIVATIVES CONTAINING GLYCOL ETHER AND THEIR USE IN COATING RESINS

[75] Inventors: Manfred Niessner, Schifferstadt; Wolfram Weiss, Mutterstadt; Jürgen Tropsch, Altrip; Matthias Kummer, Weisenheim; Georg Meichsner, Ludwigshafen, all of Germany

[73] Assignee: BASF Aktiengesellschaft, Ludwigshafen, Germany

[21] Appl. No.: 765,456

[22] PCT Filed: Jul. 13, 1995

[86] PCT No.: PCT/EP95/02747

§ 371 Date: Jan. 23, 1997

§ 102(e) Date: Jan. 23, 1997

[87] PCT Pub. No.: WO96/03449

PCT Pub. Date: Feb. 8, 1996

[30] Foreign Application Priority Data

Jul. 23, 1994 [DE] Germany .................. 44 26 186.1

[51] Int. Cl.[6] .................................................. C09D 9/00
[52] U.S. Cl. ................... 544/196; 525/154; 525/328.8; 525/375; 525/390; 525/472
[58] Field of Search .................. 544/196; 525/154, 525/375, 390, 472

[56] References Cited

FOREIGN PATENT DOCUMENTS

A 0 062 179  10/1982  European Pat. Off. .
A 0 262 518  4/1988   European Pat. Off. .
A 2 307 806  11/1976  France .
A-24 14 426  10/1975  Germany .
36 32 587   4/1988   Germany .

*Primary Examiner*—Bernard Lipman
*Attorney, Agent, or Firm*—Oblon, Spivak, McClelland, Maier & Neustadt, P.C.

[57] ABSTRACT

Binders comprise

A) an aminotriazine derivative in which the primary amino groups of the triazine are methylolated on average with at least one mole of formaldehyde per mole of primary amino groups, and these methylol groups are etherified on average with at least 0.5 mol of primary alcohol per mole of methylol group and the primary alcohols are a mixture containing a) 0.5–99.5 mol % of a $C_1$–$C_4$-alkanol and
b) 99.5–0.5 mol % of an alcohol of the formula $$R^1-O-[R^2-O]_n-R^3-OH \qquad I,$$

in which $R^1$ is $C_1$–$C_{24}$-alkyl or $C_6$–$C_{12}$-aryl which may be unsubstituted or substituted by from one to three $C_1$–$C_8$-alkyl groups, and $R^2$ and $R^3$ independently of one another are $C_2$–$C_8$-alkylene and n is an integer from 1 to 100, or of a mixture of higher-boiling alcohols having a boiling point of above 120° C. at 1 bar which contains at least 10 mol %, based on the higher-boiling alcohols, of alcohols of the formula I, and B) a radical polymer, polycondensation product or polyadduct which is crosslinkable with the aminotriazine derivative.

10 Claims, No Drawings

AMINOTRIAZINE DERIVATIVES CONTAINING GLYCOL ETHER AND THEIR USE IN COATING RESINS

BACKGROUND OF THE INVENTION

1. Field of the Invention

The invention relates to binders comprising

A) an aminotriazine derivative in which the primary amino groups of the triazine are methylolated on average with at least one mole of formaldehyde per mole of primary amino groups, and these methylol groups are etherified on average with at least 0.5 mol of primary alcohol per mole of methylol group and the primary alcohols are a mixture containing a) 0.5–99.5 mol % of a $C_1$–$C_4$-alkanol and b) 99.5–0.5 mol % of an alcohol of the formula $$R^1\text{—}O\text{—}[R^2\text{—}O]_n\text{—}R^3\text{—}OH \qquad I,$$

in which $R^1$ is $C_1$–$C_{24}$-alkyl or $C_6$–$C_{12}$-aryl which may be unsubstituted or substituted by from one to three $C_1$–$C_8$-alkyl groups, and $R^2$ and $R^3$ independently of one another are $C_2$–$C_8$-alkylene and n is an integer from 1 to 100, or of a mixture of higher-boiling alcohols having a boiling point of above 120° C. at 1 bar which contains at least 10 mol %, based on the higher-boiling alcohols, of alcohols of the formula I, and B) a radical polymer, polycondensation product or polyadduct which is crosslinkable with the aminotriazine derivative.

The invention also relates to an aminotriazine derivative in which the primary amino groups of the triazine are methylolated on average with at least one mole of formaldehyde per mole of primary amino groups, and these methylol groups are etherified on average with at least 0.5 mol of primary alcohol per mole of methylol group, and the primary alcohol is a mixture containing a) 50–99.5 mol % of a $C_1$–$C_4$-alkanol and b) 0.5–50 mol % of an alcohol of the above formula I or of a mixture of higher-boiling alcohols having a boiling point above 120° C. at 1 bar which contains at least 10 mol %, based on the higher-boiling alcohols, of alcohols of the formula I.

2. Discussion of the Background

Highly methylolated aminotriazines which are etherified to a large extent with short-chain alcohols melamine being a particular example of such aminotriazines, are used as crosslinking agents for hydroxyl-containing polymers in coating binders.

In comparison with aminotriazine derivatives having high proportions of free NH and OH groups a high degree of alkylation and etherification results in a lower solution viscosity, enabling the production of medium-solids and, in particular, high-solids coating materials. Coating compositions of this kind with a reduced content of volatile solvents are preferred on ecological grounds (lower emission of organic carbon) and offer the paint user cost advantages (lower expenditure on solvent reprocessing or incinerations. At the same time, however, a high degree of alkylation and etherification leads to a level of reactivity, in the crosslinking of OH-containing coating binders, which is reduced in relation to partially methylolated and partially etherified aminotriazine derivatives.

This lower reactivity can be compensated only by using higher baking temperatures, with the disadvantage of the higher consumption of energy and the yellowing of the coated surfaces, or by the increased addition of acidic catalysts, acids and/or their amine salts, with the disadvantage of a reduced weather resistance (hydrophilic acid remains in the coating).

DE-A 24 14 426 discloses methylolaminotriazines etherified with ethylene glycol monoethyl ether and their use as crosslinking agents for hydroxyl-containing polymers. However, the reactivity of these aminotriazine derivatives for crosslinking with hydroxyl groups remains inadequate.

DE-A-36 32 587 describes melamine-formaldehyde resins which are etherified with glycol ethers, one example being polyethylene glycol, or with other alcohols as well as the glycol ethers. Basically, however, glycol ethers are present in mixtures in a distinct excess. The resins are prepared by the simultaneous reaction of melamine, formaldehyde and glycol ethers in a substantially anhydrous process which entails the use of paraformaldehyde.

SUMMARY OF THE INVENTION

It is an object of the present invention to prepare aminotriazine derivatives whose low solution viscosity renders them suitable for the production of low-solvent coating materials and which have a markedly increased reactivity with OH-containing binders in comparison with the conventional resins such as, for example, hexamethoxymethylmelamine resins.

Other desirable properties are good elasticity, good compatibility of the aminotriazine derivatives with the other components of binders, for example for coating materials, and good performance properties of binders containing the aminotriazine derivatives.

We have found that this object is achieved by the binders defined at the outset, in which the aminotriazine derivatives A) are at least partially methylolated and etherified aminotriazines.

DETAILED DESCRIPTION OF THE PREFERRED EMBODIMENTS

Examples of suitable aminotriazines are melamine, benzoguanamine, acetoguanamine and bisguanamine such as adipo-, glutaro- or methylglutarobisguanamine, and spiroguanamines. Other suitable compounds are those which contain two or more aminotriazine moieties which may, for example, be condensed.

Preference is given to melamine and to compounds which contain two or more melamine moieties, for example from 2 to 5 melamines bridged via methylol groups, or mixtures thereof. Such mixtures of melamines and melamine resins with higher levels of condensation preferably contain at least 40 mol % of melamine. Melamine itself is particularly preferred.

The aminotriazines are methylolated with on average at least 1 mol, preferably at least 1.4 mol and particularly preferably with at least 1.7 mol of formaldehyde per mole of primary amino groups, and these methylol groups are etherified on average with at least 0.5 mol, preferably at least 0.6 mol and particularly preferably at least 0.7 mol of a mixture of primary alcohols per mole of methylol group.

This mixture contains a) from 0.5 to 99.5 mol %, preferably from 50 to 99.5 mol %, particularly preferably from 85 to 99.5 mol % and very especially from 90 to 99 mol %, based on the mixture, of a $C_1$–$C_4$-alkanol and b) from 99.5 to 0.5 mol %, preferably from 50 to 0.5 mol %, particularly preferably from 15 to 0.5 mol % and very especially from 10 to 1 mol %, based on the mixture, of an alcohol of the above formula I or of a mixture of higher-boiling alcohols having a boiling point of above 120° C. at 1 bar which contains at least 10 mol %, preferably at least 30 mol % and particularly preferably at least 60 mol % of an alcohol of the formula I.

Suitable $C_1$–$C_4$-alkanols are all those having a boiling point of below 120° C. at 1 bar, preference being given to methanol, isobutanol or n-butanol and mixtures of such alkanols.

Preferred alcohols of the formula I are those in which $R^1$ is $C_1$–$C_{24}$alkyl, preferably $C_1$–$C_6$-alkyl, $R^2$ and $R^3$ independently of one another are $C_2$–$C_8$-alkylene, preferably $C_2$–$C_4$-alkylene and particularly preferably are both ethylene, and n is an integer from 1 to 20, preferably from 1 to 5.

Examples of alkanols of the formula I are di-, tri- or tetraethylene glycol monomethyl ether and the corresponding monobutyl ethers.

Higher-boiling alcohols having a boiling point >120° C. at 1 bar, which can be employed as a mixture with the alcohols of the formula I, are preferably those having up to 20 carbon atoms and no further hetero atoms. Examples are n-pentanol, 2-pentanol, cyclopentanol, 2-methylbutanol, 3-methyl-1-butanol, cyclohexanol, 4-methyl-2-pentanol, methylcyclohexanol, hexahydrobenzyl alcohol, 2,4-dimethyl-3-pentanol, 2-ethylhexanol, nonanol, decanol, oxo alcohols and fatty alcohols where the chain is from 12 to 20 carbon atoms long, such as lauryl alcohol, tridecanol, myristyl alcohol, cetyl alcohol, stearyl alcohol or oleyl alcohol, and aryl-containing alcohols such as benzyl alcohol, o-, m- or p-methylbenzyl alcohol, 1-phenylethanol, 2-phenylethanol, α-ethylbenzyl alcohol, α-isopropylbenzyl alcohol, hydroxymethylnaphthalene and 1-(α-hydroxyethyl) naphthalene.

The aminotriazine derivatives A) are preferably prepared by transacetalization of aminotriazines which are methylolated in accordance with the abovementioned degree of methylolation and/or are etherified in accordance with the abovementioned degree of etherification and exclusively with the $C_1$–$C_4$-alkanols a). For transetherification the alcohols b) are added to these aminotriazine derivatives. The alcohols b) may be employed in only a slight excess based on the desired content of these alcohols in the aminotriazine derivative.

The transacetalization is generally carried out without the addition of solvents. The addition of solvents is possible in principle, in which case they are preferably either the alcohol a) present in the starting product and therefore, for example, methanol, ethanol, n-butanol or isobutanol, or are aprotic solvents which are unable to react with the substances employed under the reaction conditions. Examples of such solvents include ethers such as diethyl ether, diisopropyl ether, methyl tertbutyl ether, tetrahydrofuran, dioxane and 1,2-dimethoxyethane, aromatic solvents such as benzene, toluene, xylene and isopropylbenzene, or halogenated hydrocarbons such as di-, tri- and tetrachloromethane, di-, tri- and tetrachloroethane and chlorobenzene.

The reaction is preferably carried out with acid catalysis using organic and/or inorganic acids which in water at 25° C. have a pK <4, examples being citric acid, tartaric acid, lactic acid, chloroacetic acid, trichloroacetic acid, formic acid, oxalic acid, malonic acid, maleic acid, fumaric acid, phthalic acid, o-nitrobenzoic acid, o-chlorobenzoic acid, methanesulfonic acid, benzenesulfonic acid, p-toluenesulfonic acid, naphthalenesulfonic acid, hydrochloric acid, nitric acid, sulfuric acid and phosphoric acid. Also suitable are Lewis acids such as, for example, boron trifluoride or aluminum chloride.

The reaction is generally carried out at from 40° to 150° C., preferably at from 60° to 120° C., and at atmospheric or reduced pressure. Carrying out the reaction at a reduced pressure of, for example, from 1.5 to 500 mbar, preferably from 10 to 200 mbar, enables volatile constituents of the reaction mixture, predominantly the alcohol a) present in the starting product, to be removed by distillation during the reaction, thereby enabling the reaction equilibrium to be shifted in the direction of the products and high conversions of the alcohols b) to be achieved.

When the desired degree of conversion has been reached, which is at least 60% and preferably 80% based on the alcohols b) employed and is measured by the decrease in the alcohols b) or by the increase in the liberated alcohol a), the reaction is ended. This is achieved just by lowering the temperature or by also neutralizing the acid catalyst with bases such as, for example, aqueous or alcoholic sodium hydroxide or potassium hydroxide solution, or with alkylamines such as triethylamine, tri-n-propylamine, tributylamine, tri-2-ethylhexylamine, dimethylethylamine or alkanolamines such as diethanolamine, triethanolamine, triisopropanolamine, dimethylethanolamine, diethylethanolamine, dibutylethanolamine, methyldiethanolamine or butyldiethanolamine.

The transacetalization may be carried out in one or more steps. In the case of alcohol mixtures b) the reaction can, for example, be carried out first with an alcohol, up to a degree of conversion of at least 60%, after which further acid catalyst and the remaining alcohol(s) may be added and the reaction continued.

The reaction may be followed by a further distillation under reduced pressure of from 5 to 200 mbar and at the prevailing temperature or an increased temperature of from 40° to 140° C., in order substantially to remove residual volatile components. The resins obtained are clear with little or no color and have a viscosity of preferably from 0.5 to 20 Pa.s (at 23° C.) and a content of unreacted alcohol b) of preferably below 20% by weight, in particular below 10% by weight and especially below 5% by weight.

If desired the resin can also be diluted with solvent.

In addition to the aminotriazine derivative A) the binder of the invention comprises a radical polymer, polycondensation product or polyadduct B), which can be crosslinked with the aminotriazine derivative owing, for example, to its content of active hydrogen atoms (OH, NH and/or SH groups).

Suitable examples of component B) are alkyd resins, polyester resins, epoxy resins, polyurethane resins, and radical polymers based on acrylates, vinyl esters, dienes and aromatic vinyl compounds, or mixtures thereof.

Preference is given to radical polymers, polycondensation products or polyadducts containing OH groups, preferably having a hydroxyl number of from 20 to 200 mg of KOH/g of solids (in accordance with DIN 53240).

The binders according to the invention may for example contain from 1 to 99% by weight, preferably from 1 to 40% by weight and particularly preferably from 5 to 30% by weight of the aminotriazine derivatives A) and from 1 to 99% by weight, preferably from 60 to 99% by weight and particularly preferably from 70 to 95% by weight of component B), based on the sum of A) and B).

Examples of the form in which the binders may be present are solutions in water or organic solvents, or aqueous dispersions.

Additives which are conventional for the particular use intended may be added to the binders, examples of such additives being Theological auxiliaries, leveling agents, antifoams, pigments, dyes, etc.

The binders are particularly suitable for coating materials, especially as coating binders.

In this context they are suitable for a wide variety of substrates, such as glass, plastics, metal or wood.

The coating materials may be applied by the conventional methods, for example by brushing, dipping, rolling, knife-coating or spraying.

The binders according to the invention are distinguished by a high crosslinking reactivity which permits markedly shorter reaction times both on thermal curing (stoving enamels) and in the case of acid catalysis (acid-curing coating materials) in comparison with known, fully alkylated amino resins as have been employed, for example, as the starting material for the transetherification.

Suitable catalysts for the acid catalysis are, for example, strong acids such as sulfonic acids (e.g. para-toluenesulfonic acid, naphthalenesulfonic acid, etc.), phosphoric acid or derivatives of phosphoric acid, hydrochloric acid or other mineral acids. Metal salts such as zinc nitrate can also be employed, as can amine salts of the abovementioned acids, for example of p-toluenesulfonic acid with triethanolamine; it is also possible to add the components individually or to use commercial amine salts such as Nacure® grades.

The aminotriazine derivatives of the invention are particularly suitable in addition as sole binders for the coating, for example, of veneer finishing strips on furniture. For this purpose they may contain the abovementioned additives, but especially plasticizers and catalysts, for example polyalkylene glycols and arylsulfonic acids, for the curing operation, which is conventionally carried out at high temperatures.

EXAMPLES

All percentages are by weight unless specified otherwise.

The commercially available hexamethoxymethylmelamine (HMMM) resins, which are generally employed as precursors, constitute mixtures of different compounds, some of them including two or more melamine moieties. For this reason they are liquid at below 46° C., which is the melting point of HMMM. Of course it is also possible to use pure crystalline HMMM as starting material, and the transacetalization generally leads to liquid products. In calculating the reaction mixtures an average molar mass of 390 g/mol—the molar mass of HMMM—was assumed for the HMMM resins used.

The glycol ethers are also subject to molecular weight distributions, especially when the number of ethylene oxide units is relatively high. Here too the molecular weight is calculated from the average number of ethylene oxide units incorporated.

The catalyst, p-toluenesulfonic acid, is always employed in the form of the monohydrate having a molar mass of 190.22 g/mol.

1. Methods of testing and analysis

Free formaldehyde

Determined by the titrimetric sulfite method according to DIN 16746-A.

Total formaldehyde

Determined titrimetrically after acid digestion.

Alcohol and glycol ether, free

Determined by gas chromatography.

Alcohol, bonded

Determined from the difference between the total alcohol content found by gas chromatography after acid digestion, and the content of free alcohol.

Nonvolatile components/solids content

In a method based on DIN 53216 2 g of resin and 2 g of butanol are weighed on a metal sheet intended for determining the content of dry matter and are baked in a convection oven at 125° C. for two hours and then weighed again to calculate the nonvolatile fraction in % by weight (baking residue).

Viscosity

The viscosity of the resins is determined using a plate/cone viscometer: VISKO-PLOT from Epprecht Instruments and Controls AG, CH5606 Dottikon.

2 Transacetalization products

General preparation procedure for Examples 1 to 16

In an apparatus which is suitable for vacuum distillation and fitted with stirrer, condenser and distillation receiver, the quantity of glycol ether indicated in the examples of Table 1, with or without further high-boiling alcohols and with the stated amount of ptoluenesulfonic acid (pTSA) as catalyst are added to 1.5 mol of a hexamethoxymethylmelamine resin, and the mixture is heated to the temperature indicated. After it has reached this temperature distillation is carried out for one hour at the pressure indicated, and the batch is neutralized with a quantity of tributylamine which is equivalent to the quantity of acid employed. After the neutralization the batch is heated to 110° C. and then distilled for 15 minutes at reduced pressure, diluted if appropriate with the quantity of 1-methoxy-2-propanol indicated, and cooled to room temperature. After filtration the resins obtained are clear and colorless or pale yellow, and are stable for at least 6 months: that is, they exhibit no phase separation and remain able to be processed. The analytical data are compiled in Table 2.

TABLE 1

| Ex. No. | Glycol ether | Quantity employed [g] | Quantity employed [mol] | Reaction conditions Temp. [°C.] | Reaction conditions Pressure [mbar] | 1-Methoxy-2-propanol [g] | pTSA rel. to initial charge [mol %] | Yield [g] | Yield [%] |
|---|---|---|---|---|---|---|---|---|---|
| 1 | Diethylene glycol monomethyl ether | 18 | 0.15 | 82 | 30 | 30 | 1.36 | 598 | 100 |
| 2 | Diethylene glycol monomethyl ether | 90 | 0.75 | 86 | 25 | — | 1.36 | 631 | 97 |
| 3 | Diethylene glycol monomethyl ether | 180 | 1.50 | 83 | 40 | — | 1.39 | 692 | 97 |
| 4 | Triethylene glycol monomethyl ether | 123 | 0.75 | 87 | 48 | — | 1.37 | 663 | 97 |
| 5 | Triethylene glycol monomethyl ether | 247 | 1.50 | 88 | 50 | — | 1.42 | 765 | 98 |
| 6 | Tetraethylene glycol monomethyl ether | 156 | 0.75 | 91 | 20 | — | 1.36 | 698 | 97 |

TABLE 1-continued

| Ex. No. | Glycol ether | Quantity employed [g] | [mol] | Reaction conditions Temp. [°C.] | Pressure [mbar] | 1-Methoxy-2-propanol [g] | pTSA rel. to initial charge [mol %] | Yield [g] | [%] |
|---|---|---|---|---|---|---|---|---|---|
| 7 | Tetraethylene glycol monomethyl ether | 312 | 1.59 | 88 | 27 | — | 1.35 | 837 | 99 |
| 9 | Diethylene glycol monobutyl ether | 24 | 0.15 | 83 | 32 | 35 | 1.36 | 605 | 100 |
| 9 | Diethylene glycol monobutyl ether | 61 | 0.38 | 83 | 35 | — | 1.36 | 607 | 96 |
| 10 | Diethylene glycol monobutyl ether | 122 | 0.75 | 86 | 26 | — | 1.36 | 659 | 96 |
| 11 | Triethylene glycol monobutyl ether | 155 | 0.75 | 90 | 23 | — | 1.39 | 696 | 95 |
| 12 | Methylpolyglycol*) | 78 | 0.15 | 88 | 35 | — | 1.40 | 625 | 95 |
| 13 | Methylpolyglycol | 390 | 0.75 | 81 | 42 | — | 1.74 | 919 | 97 |
| 14 | Methylpolyglycol | 780 | 1.51 | 93 | 40 | — | 1.45 | 1283 | 97 |
| 15 | Lutensol® AO 3**) | 780 | 2.25 | 91 | 53 | — | 1.36 | 1258 | 97 |
| 16 | Lutensol AO 7**) | 1176 | 2.25 | 91 | 62 | — | 2.61 | 1656 | 98 |

*) $R^1 = CH_3$, n = 11
**) Oxo alcohol with 3 or 7 ether groups

TABLE 2

| Example No. | Baking residue [% by wt.] | Viscosity at 23° C. [Pa*s] | Methanol, free [% by wt.] | Glycol ether, free [% by wt.] |
|---|---|---|---|---|
| 1 | 88.8 | 5.3 | 2.2 | 0.1 |
| 2 | 88.9 | 5.6 | 0.8 | 0.3 |
| 3 | 87.9 | 3.2 | 0.5 | 0.6 |
| 4 | 90.3 | 5.7 | 0.6 | 0.3 |
| 5 | 87.8 | 2.2 | 0.7 | 0.4 |
| 6 | 89.6 | 3.8 | 0.4 | 0.2 |
| 7 | 86.2 | 1.3 | 0.7 | 0.5 |
| 8 | 87.0 | 5.4 | 1.4 | <0.1 |
| 9 | 90.5 | 10.2 | 0.5 | <0.1 |
| 10 | 90.7 | 3.5 | 0.5 | 0.3 |
| 11 | 92.9 | 5.4 | 0.5 | <0.1 |
| 12 | 92.6 | 15.0 | 0.7 | — |
| 13 | 90.2 | 2.0 | 0.2 | — |
| 14 | 90.3 | 0.7 | <0.1 | — |
| 15 | 93.0 | 0.6 | 0.2 | — |
| 16 | 91.3 | 0.3 | <0.1 | — |

General Preparation Procedure for Examples 17 to 20 and for Comparison Example 1

1.5 mol of a hexamethoxymethylmelamine resin are placed in an apparatus which is suitable for vacuum distillation and is provided with stirrer, condenser and distillation receiver, and 0.25 mol of diethylene glycol monomethyl ether is added per mole of melamine in the starting material. The quantity of the acid catalyst stated in the Examples is added and the mixture is heated to 85° C. . After reduction of the pressure to 15 mbar, volatile constituents are distilled off for one hour and the batch is then neutralized with a quantity of triethanolamine which is equivalent to the quantity of acid employed. Distillation is repeated for 15 minutes at 110° C. and 15 mbar, the stated quantity of butyl glycol is added as diluent if appropriate, and the batch is cooled to room temperature. The resins obtained after filtration are clear and colorless or pale yellow, and have the analytical characteristics indicated in Table 3.

TABLE 3

| Example No. | Acid catalyst | Quantity [g] | [mol % in rel. to initial charge] | Butyl glycol [g] | Yield [g] | Baking residue [% by wt.] | Viscosity at 23° C. [Pa · s] | Methanol, free [% by wt.] | Glycol monoether, free [% of quantity employed] |
|---|---|---|---|---|---|---|---|---|---|
| 17 | Oxalic acid dihydrate | 0.59 | 0.31 | — | 512 | 94.2 | 4.0 | 0.3 | 6.6 |
| 18 | Boron trifluoride etherate, 48% | 0.92 | 0.21 | — | 510 | 94.7 | 7.7 | 0.3 | 2.6 |
| 19 | p-Toluene-sulfonic acid | 1.75 | 0.62 | 30 | 530 | 87.4 | 4.3 | 0.8 | 1.4 |

TABLE 3-continued

| Example No. | Acid catalyst | Quantity [g] | [mol % in rel. to initial charge] | Butyl glycol [g] | Yield [g] | Baking residue [% by wt.] | Viscosity at 23° C. [Pa · s] | Methanol, free [% by wt.] | Glycol monoether, free [% of quantity employed] |
|---|---|---|---|---|---|---|---|---|---|
| 20 | Nitric acid 30% | 1.96 | 0.62 | 30 | 530 | 93.5 | 5.1 | 0.1 | 1.4 |
| Comparison Example 1 | Acetic acid | 0.56 | 0.62 | — | 527 | 88 | 1.0 | <0.1 | 93.2 |

Example 21

In a reactor with stirrer, condenser and distillation receiver, 460 g of the hexamethoxymethylmelamine resin Cymel 303 are mixed with 36 g of diethylene glycol monomethyl ether and 2.80 g of p-toluenesulfonic acid and the mixture is heated to 85° C. Volatile components are removed by distillation for one hour at this temperature and at a pressure of 25 mbar. Following neutralization with tributylamine the distillation is continued for a further 15 minutes at 100° C. and 25 mbar. After dilution with 35 ml of methoxypropanol and filtration 490 g of a clear, colorless resin are obtained which gives a baking residue of 89.8% and has a viscosity of 4.3 Pa.s at 23° C.

The resin contains 0.3% of free methanol, and the conversion of diethylene glycol monomethyl ether is 96%.

Example 22

514 g of hexabutoxymethylmelamine are mixed with 0.5 mol of tetraethylene glycol monomethyl ether per dole of melamine and with 0.5% by weight of p-toluenesulfonic acid and the mixture is heated to 90° C. Volatile components and reaction products are distilled off for 60 minutes at 30 mbar and 90° C. Following neutralization with triethanolamine distillation is continued for a further 15 minutes at reduced pressure and 110° C. After cooling and filtration a clear colorless resin is obtained in a yield of 95% which has a viscosity of 4.5 Pa.s at 23° C.

Example 23

The volatile components and reaction products are distilled off over 60 minutes at 30 mbar and 90° C. from a mixture of 1.6 mol (based on melamine) of a hexabutoxymethylmelamine resin with 164 g of diethylene glycol monobutyl ether and 0.5% by weight of p-toluenesulfonic acid. Distillation is continued at 25 mbar and 110° C., after neutralization with methyldiethanolamine, for 15 minutes. After cooling and filtration the viscosity of the clear colorless resin is 4.0 Pa.s.

Comparison Example 2

In analogy to Example 1 in DE-C 24 14 426, 700 g of a hexamethoxymethylmelamine were dissolved in 1520 g of ethylene glycol monomethyl ether in a reactor with stirrer, condenser and distillation receiver. 28 g of 65% strength nitric acid were added and the mixture was stirred at 35° C. for 35 minutes. After neutralization with 25 g of 50% strength sodium hydroxide solution a pH of 8.5 was established. The solution was concentrated at a temperature of 85° C. and a pressure of from 90 to 130 mbar over the course of 2.5 hours. The pressure was reduced to 30 mbar and the distillation was continued for a further 30 minutes. After removal of the precipitated sodium nitrate by filtration, 940 g of a colorless, clear resin were obtained which had a viscosity of 650 means at 23° C. It was impossible to detect free methanol, and the content of free ethylene glycol monomethyl ether was 15.5%.

General Preparation Procedure for Examples 24 to 28

468 g of a hexamethoxymethylmelamine resin were mixed with one mole of tetraethylene glycol monomethyl ether per mole of melamine in the HMMM resin and 1.5 mol % of p-toluenesulfonic acid. The alcohol listed in Table 4, in the quantity given there, is added and the mixture is heated to 85° C. After reaching this temperature the pressure is reduced to 20 mbar and then volatile components are distilled off for 80 minutes. The mixture is cooled to 60° C., neutralized with tributylamine, heated to 110° C. and distilled under reduced pressure for a further 20 minutes. After cooling and filtration clear, colorless resins are obtained in yields of more than 95%, which resins have the analytical data indicated in Table 4.

TABLE 4

| Ex. No. | Alcohol | Quantity employed [g] | Baking residue [% by wt.] | Viscosity at 23° C. [mPa · s] | Methanol, free [% by wt.] | TGMM[a], free [%] | Alcohol[b], free |
|---|---|---|---|---|---|---|---|
| 24 | Cyclohexanol | 249.9 | 84 | 2.080 | 1.0 | 0.6 | 0.1 |
| 25 | 2-Ethythexanol | 78.1 | 66 | 1.240 | 0.9 | 0.3 | 0.9 |
| 26 | Lauryl alcohol | 111.8 | 88 | 960 | 0.5 | 0.6 | <1.4 |
| 27 | Benzyl alcohol | 259.5 | 83 | 2.000 | 0.8 | 1.0 | 1.0 |
| 28 | 1,4-Butanediolmono-acrylate | 195.5 | 91 | 1.760 | 0.3 | 1.6 | 0.8 |

[a] Percentage of tetraethylene glycol monomethyl ether in the end product based on quantity of TGMM employed.
[b] Percentage of the alcohol of column 2 in the end product based on the quantity employed (column 3).

3. Coating formulations

General Preparation Procedure for an Acid-curing Coating Material 70 g of Alftalat AR (alkyd resin) 300 (60 percent), 20 g of the melamine-formaldehyde (MF) resin specified in the Examples (95% by weight) and 52 g of ethanol/1-methoxy-2-propanol (2:1) are stirred together with a spatula. Eased on the MF resin, 12% by weight of p-toluenesulfonic acid (20% strength solution in ethanol) are added to the coating material as curing agent. The coating material prepared in this way has a solids content of about 40% by weight. Alftalat AR 300 and melamine resin are present in the binder mixture in a ratio of 7:3.

General Preparation Procedure for the Solvent-containing White-pigmented Stoving Enamel Pigment Paste 1200 g of the titanium dioxide pigment Kronos RN 57, 1000 g of the alkyd resin binder Alkydal R 40 (60 percent in xylene) and 200 g of methoxypropanol are dispersed twice on a hopper mill to give a uniform paste.

Paint Formulation 30 g of the above-described pigment paste, 22.5 g of the alkyd resin Alkydal R40, and a quantity of the MF resin listed in the Examples which corresponds to 9.0 g of solid resin, are stirred together with a spatula. Alkydal R40 and MP resin are present in the binder mixture in a ratio of 7:3, and there is twice as much binder as pigment (solvent:binder:pigment 2:2:1).

General Preparation Procedure for a Solvent-containing Clearcoat

A clearcoat is prepared by stirring together 50 g of an OH-containing polyacrylate (Luprenal® 240 S) having an OH number of 65 and a solids content of 60% by weight and 20 g of melamine resin, based on the solids content of the melamine resins specified in the Examples, and a quantity of a hydrocarbon (Solvesso® 100) which is sufficient for a solids content of 50% by weight. 0.5% by weight of p-toluenesulfonic acid may be added to the coating material to accelerate curing.

4. Testing of coatings

In order to emphasize the performance advantage of the binders or amino resins according to the invention, each coatings test employed as comparison material a commercially available hexamethoxymethylmelamine resin (HMMM comp.) as was employed as starting material in some of the preceding Examples, which resin has the following analytical characteristics:

| Solids content | 93–96% |
| Viscosity (23° C.) | 2000–6000 mPa · s |
| Free formaldehyde | <0.5% |
| Methanol, attached | >5 mol/mol of melamine |
| Formaldehyde, attached | >5.5 mol/mol of melamine |

In order to provide comparability, within each series resins according to the invention and the standard resin were processed and tested under comparable conditions.

General Procedure for Testing the Baking Reactivity

6 Glass plates (90×150×2 mm) are coated using a 150 µm film-drawing frame with the solvent-containing white-pigmented coating material prepared by the above procedure and containing the amino resin specified in the Examples which follow, while 6 glass plates were coated with an identical coating material containing the commercial comparison resin instead of the amino resin of the invention, and the coatings were cured alongside one another in a drying cabinet at constant temperature. One glass plate each of the comparison and of the sample are removed after 10, 20, 30, 40, 50 and 60 min and, after being allowed to cool for at least ten minutes, the pendulum hardness is determined in accordance with DIN 53157.

General Procedure for Testing the Acid Curing (Kempf Test)

A 100 µm film-drawing frame is used to coat a 380×67×3 mm glass plate with the acid-curing coating material prepared by the above procedure. After storage for five minutes in a convection oven at 40° C. followed by storage for five minutes at room temperature the progress of the curing reaction is determined on the basis of the decrease in tack of the surface, using a Kempf chalking rate tester (supplier: Erichsen GmbH & Co. KG, S870 Hemer-Sundwig/Westphalia). In this test the tack is assessed by comparison with a scale (rating 5=highly tacky, rating 0=tack-free). The curing and testing cycle is carried out a total of six times.

General Procedure for the Gradient Oven Test

The stoving enamel is coated using a 200 µm film-drawing frame onto a 567×90×0.75 mm deep-drawn metal panel, flushed off for 10 minutes and baked in a gradient oven, Byk type 2612, for 30 minutes over a temperature range from 80° C. to 180° C. After storage for 24 hours at 50% relative atmospheric humidity and 23° C. the following tests are carried out in succession in the individual temperature zones:

The coating thickness is determined using a Deltascope coating thickness meter from Fischer, 7032 Sindelfingen.

The pendulum hardness is determined in accordance with DIN 53157 using a Byk instrument type 5840.

The crosshatch test is carried out in accordance with DIN 53151 using a crosshatching blade and adhesive tape.

The Erichsen indentation is determined in accordance with DIN 53156 using a Byk instrument type 5313.

The xylene resistance is determined by storage of one side of the panel, standing on its long side, to a depth of about 3 cm in a xylene bath for 10 minutes, and is then assessed: 1=no change in the coating film, 0.5=slight damage by scratching with the fingernail, 0=the coating film can be detached by rubbing with a cloth.

Test Results

White-pigmented solvent-containing stoving enamels and acid-curing coating materials were prepared by the general preparation procedure, using the MP resins listed in Tables 5 and 6. The pendulum hardnesses after baking at 150° C. are indicated in Table 5. The results of acid curing (Kempf tests) are compiled in Table 6.

TABLE 5

| | Pendulum hardness (seconds) | | | | | |
|---|---|---|---|---|---|---|
| MF resins from Ex. No. | after 10 min | after 20 min | after 30 min | after 40 min | after 50 min | after 60 min |
| 3 | 36 | 97 | 133 | 154 | 167 | 172 |
| 5 | 35 | 83 | 126 | 153 | 162 | 171 |
| 7 | 35 | 85 | 118 | 134 | 158 | 161 |
| 8 | 57 | 91 | 122 | 143 | 158 | 168 |
| 12 | 56 | 116 | 129 | 148 | 158 | 165 |
| 20 | 14 | 44 | 71 | 78 | 83 | 91 |
| 21 | 63 | 94 | 110 | 116 | 130 | 137 |

TABLE 5-continued

| | Pendulum hardness (seconds) | | | | | |
|---|---|---|---|---|---|---|
| MF resins from Ex. No. | after 10 min | after 20 min | after 30 min | after 40 min | after 50 min | after 60 min |
| ComparisonExample1 | 8 | 23 | 37 | 43 | 53 | 58 |
| ComparisonExample2 | 7 | 10 | 27 | 30 | 36 | 40 |
| HMMMComp. | 10 | 30 | 44 | 58 | 71 | 82 |

The high values for the pendulum hardness where MF resins from the Examples are used rather than those from the Comparison Examples or HMMM emphasize the high reactivity. The increased reactivity in acid curing is documented by the rapid attainment of a tack-free film.

White-pigmented solvent-containing stoving enamels were prepared in accordance with the general procedure given above using the MF resins from Examples 2, 6 and 9 and using a HMMM comparison.

TABLE 6

| | Kempf test (rating) | | | | | |
|---|---|---|---|---|---|---|
| Amino resin from Example No. | 1 Cycle | 2 Cycles | 3 Cycles | 4 Cycles | 5 Cycles | 6 Cycles |
| 3 | 0–1 | 0 | — | — | — | — |
| 5 | 1–2 | 1 | 0–1 | 0–1 | 0 | — |
| 7 | 1–2 | 0–1 | 0–1 | 0 | — | — |
| 9 | 1 | 0–1 | 0 | — | — | — |
| 12 | 1 | 0–1 | 0 | — | — | — |
| 20 | 0–1 | 0–1 | 0 | — | — | — |
| 21 | 1 | 0–1 | 0–1 | 0 | — | — |
| Comparison Example 1 | 5 | 5 | 4 | 4 | 3–4 | 3–4 |
| Comparison Example 2 | 3–4 | 2 | 1–2 | 0 | — | — |
| HMMM Comp. | 5 | 3–4 | 2–3 | 1–2 | 1 | 0–1 |

Using the amino resins of the invention from Examples 24, 27 and 28, and the comparison HMMM resin, acid-curing clearcoats and solvent-containing white-pigmented coating materials are prepared for testing the baking reactivity, and are processed and tested in accordance with the general procedures for plotting the curing curve and for testing the acid curing. The results of the thermal curing and of the acid curing are compiled in Tables 7 and 8.

The coating materials prepared in this way were knife-coated onto deep-drawn metal panels and, in accordance with the general procedure, were baked in a gradient oven and tested. The test results are compiled in Tables 9 and 10.

The high values for the pendulum hardness at relatively low baking temperatures (Table 9) emphasize the high reactivity, as does the attainment of a xylene-resistant film at below 180° C. (Table 10).

TABLE 7

| | Pendulum hardness (seconds) | | | | | |
|---|---|---|---|---|---|---|
| MF resin from Example No. | after 10 min | after 20 min | after 30 min | after 40 min | after 50 min | after 60 min |
| 24 | 25 | 67 | 73 | 99 | 122 | 136 |
| 27 | 12 | 43 | 88 | 99 | 130 | 144 |
| 28 | 15 | 97 | 139 | 157 | 162 | 171 |
| HMMMcomp. | 0 | 23 | 35 | 58 | 74 | 92 |

TABLE 8

| | Kempf test (rating) | | | | | |
|---|---|---|---|---|---|---|
| MF resin from Example No. | 1 Cycle | 2 Cycles | 3 Cycles | 4 Cycles | 5 Cycles | 6 Cycles |
| 24 | 3 | 1 | 0–1 | 0 | — | — |
| 27 | 2 | 1–2 | 1 | 0–1 | 0 | — |
| 28 | 4 | 1–2 | 0–1 | 0 | — | — |
| HMMMcomp. | 4–5 | 3–4 | 2 | 1–2 | 0–1 | 0 |

TABLE 9

| MF resin from Example No. | Parameter | Temperature [°C.] | | | | | | | | |
|---|---|---|---|---|---|---|---|---|---|---|
| | | 100 | 110 | 120 | 130 | 140 | 150 | 160 | 170 | 180 |
| 2 | Coating thickness [μm] | 44 | 48 | 47 | 46 | 50 | 51 | 51 | 52 | 47 |
| 6 | | 46 | 46 | 48 | 47 | 52 | 49 | 48 | 50 | 52 |
| 9 | | 47 | 50 | 48 | 51 | 50 | 48 | 48 | 46 | 48 |
| HMMM Comp. | 42 | 44 | 40 | 44 | 46 | 47 | 45 | 45 | 48 | |
| 2 | Pendulum hardness (Number of swings) | 8 | 19 | 48 | 88 | 105 | 116 | 124 | 132 | 141 |
| 6 | | 8 | 19 | 42 | 78 | 94 | 108 | 124 | 129 | 110 |
| 9 | | 8 | 16 | 41 | 76 | 101 | 111 | 124 | 136 | 110 |
| HMMM Comp. | | 8 | 8 | 11 | 16 | 27 | 42 | 76 | 109 | 106 |
| 2 | Erichsen indentation [mm] | 9.0 | 9.0 | 9.0 | 7.9 | 6.6 | 7.0 | 5.8 | 2.5 | 4.7 |
| 6 | | 9.0 | 9.0 | 9.0 | 8.2 | 7.7 | 5.4 | 3.7 | 2.5 | 1.5 |
| 9 | | 9.0 | 9.0 | 9.0 | 8.2 | 7.5 | 6.8 | 4.4 | 4.3 | 4.7 |
| HMMM Comp. | | 9.0 | 9.0 | 9.0 | 9.0 | 9.0 | 9.0 | 9.0 | 8.0 | 9.0 |

TABLE 10

| Example No. | Xylene-resistant [°C.] |
|---|---|
| 2 | 150 |
| 6 | 150 |
| 9 | 150 |
| HMMM Comp. 7 | >180 |

The coating is resistant to xylene above the indicated temperature.

The amino resin of Example 19 according to the invention and a HMMM comparison resin were used to prepare solvent-containing clearcoats and an acid-catalyzed solvent-containing clearcoat in accordance with the general procedure. The coating materials prepared in this way were knife-coated onto deep-drawn metal panels, baked in a gradient oven in accordance with the general procedure and tested. The test results are compiled in Tables 11 and 12 and indicate, via the rapid rise in pendulum hardness and the low-temperature attainment of resistance to water and xylene, the high reactivity of the melamine-formaldehyde resins according to the invention, which can be increased further by acid catalysis.

TABLE 11

| MF resin from Ex. No. | Parameter | Temperature [°C.] | | | | | | | | |
|---|---|---|---|---|---|---|---|---|---|---|
| | | 100 | 110 | 120 | 130 | 140 | 150 | 160 | 170 | 180 |
| 19 without pTSA | Coating thickness [μm] | 28 | 34 | 36 | 37 | 37 | 39 | 36 | 35 | 34 |
| 19 with pTSA | | 35 | 37 | 38 | 39 | 38 | 36 | 36 | 35 | 34 |
| HMMM comp. | | —a) | — | 28 | 29 | 33 | 33 | 30 | 31 | 32 |
| 19 without pTSA | Pendulum attenuation [Number of swings] | 4 | 11 | 19 | 29 | 41 | 63 | 81 | 97 | 102 |
| 19 with pTSA | | 40 | 56 | 68 | 80 | 87 | 95 | 96 | 102 | 103 |
| HMMM comp. | | — | — | — | — | — | — | 12 | 44 | 82 |

TABLE 12

| MF resin from Ex. No. | The coating is resistant to xylene above | The coating is resistant to water above |
|---|---|---|
| 19 without pTSA | 180° C. | 120° C. |
| 19 with pTSA | 160° C. | 120° C. |
| HMMM comp. | >190° C. | 170° C. | a) impossible to determine owing to insufficient curing of coating

We claim:

1. A binder comprising

A) an aminotriazine derivative in which the primary amino groups of the triazine are methylolated on average with at least one mole of formaldehyde per mole of primary amino groups, and these methylol groups are etherified on average with at least 0.5 mol of primary alcohol per mole of methylol group and the primary alcohols are a mixture containing a) 0.5–99.5 mol % of a $C_1$–$C_4$-alkanol and b) 99.5–0.5 mol % of an alcohol of the formula $$R^1-O-[R^2-O]_n-R^3-OH \qquad I$$

in which $R^1$ is $C_1$–$C_{24}$-alkyl or $C_6$–$C_{12}$-aryl which may be unsubstituted or substituted by from one to three $C_1$–$C_8$-alkyl groups, and $R^2$ and $R^3$ independently of one another are $C_2$–$C_8$-alkylene and n is an integer from 1 to 100, or of a mixture of higher-boiling alcohols having a boiling point of above 120° C. at 1 bar which contains at least 10 mol %, based on the higher-boiling alcohols, of alcohols of the formula I, and B) a radical polymer, polycondensation product or polyadduct which is crosslinkable with the aminotriazine derivative.

2. A binder as claimed in claim 1, comprising a radical polymer having a hydroxyl number of from 20 to 200.

3. A binder as claimed in claim 1, comprising an aqueous dispersion of components A.

4. A binder as claimed in claim 1, comprising an aminotriazine resin in which the primary amino groups of the triazine are methylolated with at least 1.7 mol of formaldehyde per mole of primary amino group, and these methylol groups are etherified with at least 0.7 mol of primary alcohol.

5. An aminotriazine derivative in which the primary amino groups of the triazine are methylolated on average with at least one mole of formaldehyde per mole of primary amino groups, and these methylol groups are etherified on average with at least 0.5 mol of primary alcohol per mole of methylol group, and the primary alcohol is a mixture containing a) 50–99.5 mol % of a $C_1$–$C_4$-alkanol and b) 0.5–50 mol % of an alcohol of the above formula I or of a mixture of higher-boiling alcohols having a boiling point above 120° C. at 1 bar which contains at least 10 mol %, based on the higher-boiling alcohols, of alcohols of the formula I.

6. An aminotriazine derivative as claimed in claim 5, in which the primary alcohol is a mixture of a) 90–99 mol % of a $C_1$–$C_4$-alkanol and b) 10–1 mol % of an alcohol of the formula I or of the mixture of higher-boiling alcohols.

7. An aminotriazine derivative as claimed in claim 5, which has been prepared by transacetalization of aminotriazine derivatives, etherified only with $C_1$–$C_4$-alkanols, with the alcohols b) in the presence of an acid which in water at 25° C. has a pK<4.

8. An aminotriazine derivative as claimed in claim 7, where the conversion of the alcohols b) in the transacetalization is greater than 50% based on the alcohols b) employed.

9. A substrate coated with a binder as claimed in claim 1.

10. A method, comprising coating a substrate with the binder of claim 1.

* * * * *